United States Patent [19]
Anzur

[11] 3,979,827
[45] Sept. 14, 1976

[54] TREE CUTTING ATTACHMENT FOR POWER MOWERS OR THE LIKE

[76] Inventor: Ivan Anzur, 8484 Sumner Road, Chardon, Ohio 44024

[22] Filed: Feb. 28, 1975

[21] Appl. No.: 554,083

[52] U.S. Cl. .................................. 30/379; 30/500; 56/16.9
[51] Int. Cl.² .................. A01G 23/08; B27B 17/02
[58] Field of Search ............ 30/379, 381, 382, 383, 30/384, 500; 144/34 R, 34 F; 56/244, 245, 290, 291, 292, 16.9

[56] References Cited
UNITED STATES PATENTS

| | | | |
|---|---|---|---|
| 2,736,350 | 2/1956 | Hill | 30/379 |
| 2,748,809 | 6/1956 | Surgi | 30/500 |
| 2,839,097 | 6/1958 | Siria | 30/500 |

*Primary Examiner*—Al Lawrence Smith
*Assistant Examiner*—J. C. Peters
*Attorney, Agent, or Firm*—Teare, Teare & Sammon

[57] ABSTRACT

A tree cutting attachment for connection to a power mower or the like, and including an adapter means for mounting on the frame of the mower, and a cutting assembly including an elongated support arm connected to the adapter means and projecting outwardly from the side of the mower frame for engagement with a tree or the like. A continuous cutting element is movably mounted on a support arm for cutting engagement with the tree, and a drive assembly is operably connected to the cutting element being adapted for connection to the drive shaft of the power mower to impart movement to the cutting element for cutting through the tree.

5 Claims, 9 Drawing Figures

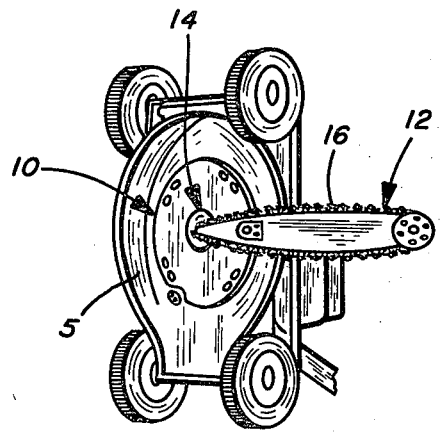
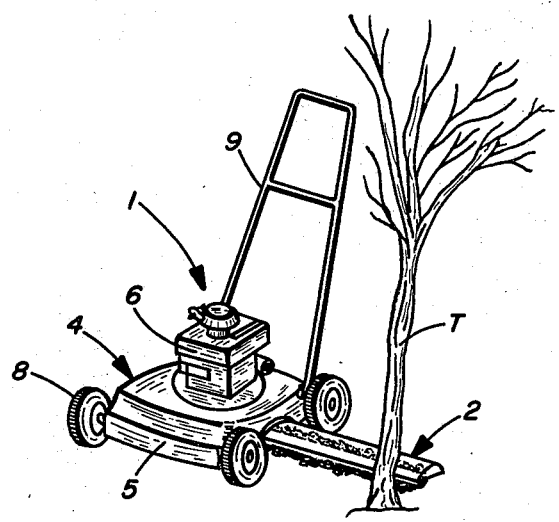
FIG. 2
FIG. 1
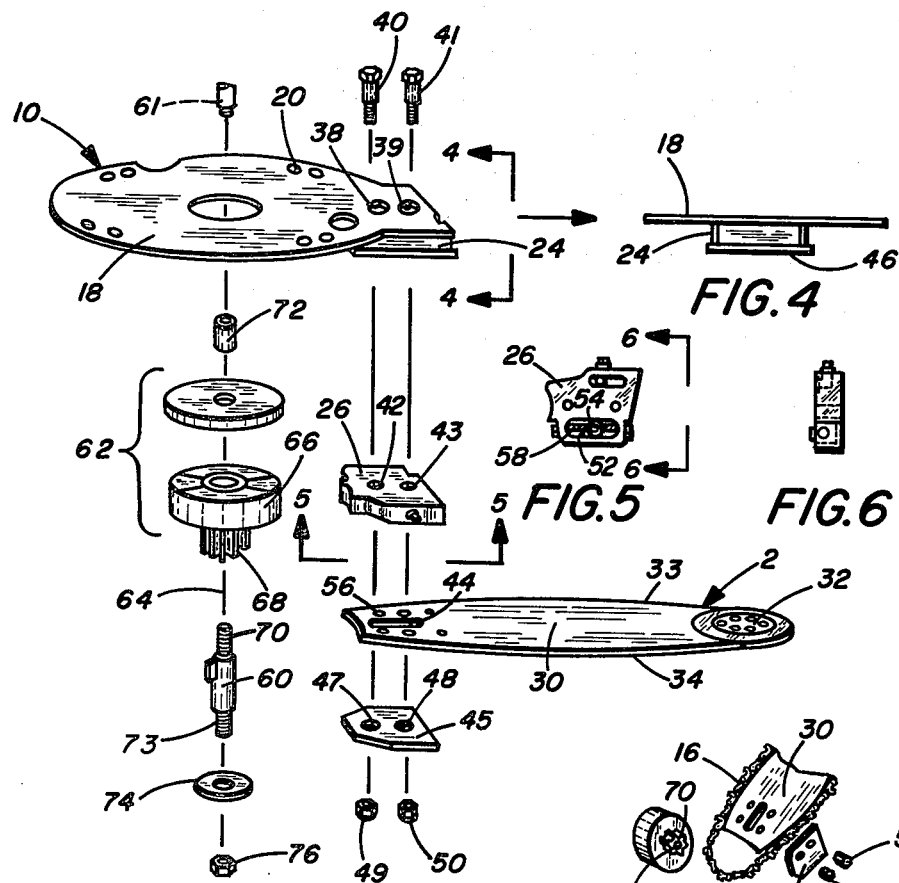
FIG. 3
FIG. 4
FIG. 5
FIG. 6
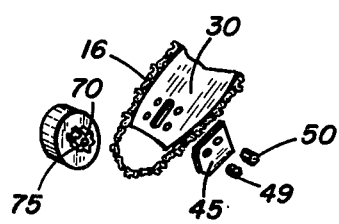
FIG. 7

TREE CUTTING ATTACHMENT FOR POWER MOWERS OR THE LIKE

BACKGROUND OF THE INVENTION

The present invention is related to a cutting attachment, and more particularly, to a cutting attachment for mounting on a power mower to facilitate the clearing of land, and more specifically, for cutting down trees or the like.

Heretofore, various forms of portable power saws have been employed for cutting, such as sawing down bushes and trees for clearing land. These former devices have been arranged to be hand carried by an operator during the sawing operation. Thus, it has been necessary for the operator to rest periodically to avoid excessive fatigue resulting in substantial loss of cutting time. In such sawing operations, it is desirable to cut the shrub or bush as close to the ground as possible. It has been quite awkward to support the prior devices in close proximity to the ground while the cutting operation was being carried out. Such an arrangement has not only contributed greatly to the fatigue of the operator, but has quite frequently resulted in an uneven or non-level cut through the tree. In addition, because the prior devices have been hand carried, the force which could be applied to the cutting element, as well as, the size of the power supply operating the device have been limited, and therefore, influenced the ease and efficiency of performing the sawing operation.

SUMMARY OF THE INVENTION

The present invention contemplates providing a new and novel tree cutting attachment for mounting on a power mower, such as the rotary-type, for cutting, such as sawing, down shrubs and trees to clear land. More particularly, the attachment comprises an adaptor plate which is arranged for mounting on the frame of the power mower and a cutting assembly is mounted on the adaptor and operably connected to the crankshaft of the power mower. The cutting assembly includes a support arm which projects outwardly from the side of the frame of the power mower, and a continuous flexible cutting element is movably mounted on the support arm for cutting engagement with the tree. A drive assembly is provided for operably connecting the cutting chain with the crankshaft of the power mower for imparting movement of the cutting chain relative to the support arm for cutting through the tree. The drive assembly further includes a driven shaft which is adapted for connection to the crankshaft of the power mower for rotational movement about a generally vertical axis. The cutting chain is supported along the peripheral edge of the support arm being operably connected to the driven shaft for movement in a generally horizontal direction upon rotation thereof. The adaptor plate is arranged for mounting adjacent the under side of the mower frame to position the cutting chain in close proximity to the ground. In the form shown, the cutting chain is supported along the opposite lengthwise edges of the support arm for cutting engagement with the tree. An adjustment means is provided between the adaptor plate and the support arm for properly tensioning the cutting chain when the attachment is in the mounted position on the power mower frame. In addition, the power mower is of a wheel construction having a handle projecting outwardly therefrom for grasping by an operator and to enable manipulation of the power mower relative to the ground, as well as, increased leverage for applying a cutting force for cutting through the tree.

As can be seen, the cutting attachment of the present invention provides a simple and sturdy arrangement for easily and efficiently cutting down trees or shrubs. More particularly, the cutting assembly is firmly supported in close proximity to the ground so that a smooth, level cut can be made through a tree or shrub without causing excessive operator fatigue. Still further, the cutting assembly is supported in such a manner that it can be easily positioned with respect to the trunk of the tree or shrub being cut, and considerably greater cutting force can be applied than with previously known hand carried cutting devices.

BRIEF DESCRIPTION OF THE DRAWINGS

FIG. 1 is a perspective view of the cutting attachment of the present invention shown mounted on a power mower in the cutting position with respect to a tree;

FIG. 2 is a perspective view of the cutting attachment of the present invention in the mounted position as seen from the underside of the power mower;

FIG. 3 is an assembly view of the cutting attachment of the present invention;

FIG. 4 is an elevation view taken along the line 4—4 of FIG. 3;

FIG. 5 is a bottom plan view taken along the line 5—5 of FIG. 3;

FIG. 6 is an elevation view taken along the line 6—6 of FIG. 5;

FIG. 7 is an assembly view showing the interconnection of the drive assembly with the cutting element.

DESCRIPTION OF THE PREFERRED EMBODIMENTS

Figure 8:
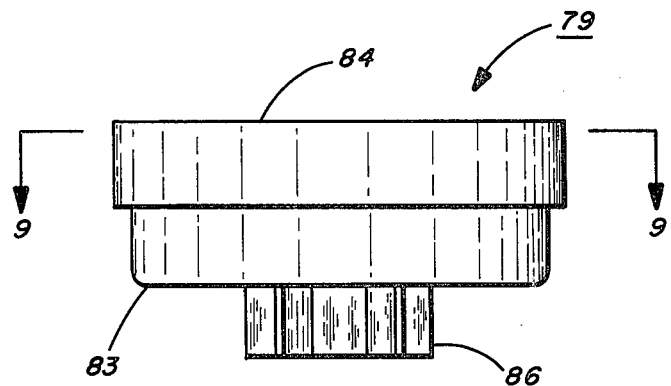
FIG. 8 is a elevation view of a modified form of the clutch assembly.

Referring now again to FIG. 1, there is shown, generally at 1, a lawn mower having the cutting attachment 2 of the present invention mounted thereon. The mower 1 is shown as being of the conventional rotary-type having a frame 4 which includes a chassis 5 on which is mounted a conventional power unit, such as a gasoline driven engine 6. The chassis is mounted on wheels 8, and a handle 9 is connected to the chassis 5 for moving the mower 1 along the ground and positioning the cutting attachment 2 in the cutting position with respect to a tree T.

Referring now to FIG. 2, the mower 1 is shown flipped-up so as to expose the underside. As shown, the cutting attachment 2 includes an adaptor means 10 for connection adjacent the underside of the chassis 5. A cutting assembly 12 is mounted on the adaptor means 10 and project outwardly from one side of the chassis 5 for engagement with the tree T to be cut. The cutting assembly 12 includes a continuous cutting element 16, such as a chain or the like, and the cutting attachment includes a drive assembly which is operably connected between the chain 16 and the power unit 6 for imparting movement to the chain 16 for cutting through the tree T.

As best seen in FIG. 3, the adapter means 10 comprises a plate 18 which may be made of any suitable material, such as steel or the like, and may be formed in different configurations to fit mowers of different types of constructions. The plate 18 is provided with a plurality of bolt holes 20 which may be provided in a plurality of patterns so as to enable the plate 18 to be mounted on the different types of mowers. Referring also to FIG. 4, a support bracket 24 is mounted adjacent the underside of the plate 18 for supporting an adjustable mounting block 26 for adjustably connecting the cutting assembly 12 to the plate 18 (FIG. 3). As best seen in FIGS. 3 and 7, the cutting assembly 12 is of a construction well known in the art and includes a support arm 30 on which the chain 16 is movably supported (FIG. 7). More particularly, a rotatable member 32 is rotatably mounted adjacent the outer end of the arm 30, and the chain 16 is wrapped about the periphery of the rotatable member 32 for movement in its lengthwise direction along the opposite edges 33 and 34 of the arm 30 so as to be exposed for cutting engagement with the tree T. The chain projects outwardly beyond the opposite end of the arm 30 for driving connections to the drive assembly 14 as will be described more fully hereinafter.

As seen in FIG. 3, the plate 18 is provided with bolt holes 38 and 39 for receiving bolts 40 and 41, respectively, for connecting the cutting assembly 12 to the plate 18. The mounting block 26 is formed with apertures 42 and 43 for receiving the bolts 40 and 41 when aligned with the holes 38 and 39. The arm 30 is provided with an elongated slot 44 for receiving the bolts 40 and 41 therethrough after insertion through the holes 38, 39 and apertures 42 and 43, respectively. An outer support plate 45 is disposed for engagement in confronting relation with respect to the underside of the arm 30 for holding the upper surface of the arm 30 and confronting engagement with the bottom plate 46 (FIG. 4) of the bracket 24. The plate 45 clamps the entire assembly together upon the tightening of nuts 49 and 50 which are threadably connected to the lower ends of the bolt 40 and 41 after their insertion through apertures 47 and 48 in the plate 45.

As shown in FIG. 5, the mounting block 26 is provided with an elongated slot 52 having a movable pin mounted therein which is adapted to be inserted in apertures 56 (FIG. 3) disposed outwardly from the slot 44. The pin 54 is threadably mounted on an adjustment screw 58 for moving the pin 54 back and forth in lengthwise direction of the slot to adjust the lengthwise position of the arm 30 with respect to the drive assembly 4 to properly adjust the tension in the cutting chain 16.

As seen in FIG. 3, the drive assembly 14 includes a drive shaft 60 which is adapted to be connected to the crankshaft 61 of the power unit 6. More particularly, the drive shaft 60 is connected through a clutch assembly 62 to the cutting chain 16 to impart movement thereto. The clutch assembly 62 may be of any conventional construction as well known in the art. For example, the clutch assembly 62 may be of the centrifugal-type as used on chain saws, such as Sears, Roebuck and Co., Model No. 917.351340, where the clutch assembly is not engaged and the chain does not move when the engine is idling. As the engine speed is increased, the clutch assembly engages. When the cutting chain binds, the engine speed is reduced and the clutch assembly disengages. As shown, the clutch assembly 62 includes an outer member 66 which is rotatable with respect to the shaft 60. A driving gear 68 is mounted on the outer member 66 being adapted for driving engagement with the cutting chain 16 for moving the cutting chain in a generally horizontal plane. The drive shaft 60 is threaded adjacent its upper end, as at 70, for connection within an adapter sleeve 72 which is connected to the crankshaft 61 of the power unit 6. The lower end of the shaft, as at 73 is also threaded to receive a washer 74 and nut 76 for holding the drive assembly in the installed position. By this arrangement, when cutting chain 16 encounters an obstruction and excessive torque is applied to the power unit 6, the gear 68 will slip with respect to the drive shaft 60 to prevent stalling of the power unit 6 or injury to other parts of the attachment 2.

As can be seen from the foregoing, when the attachment 2 is in the mounted position on the mower 1, it is held firmly supported by the chassis in close proximity and in a generally horizontal position with respect to the ground. Further, the assembly is firmly held in this position by the chassis 5. The operator can maneuver the chain by means of the handle 9, and thus, can position the cutting chain for a smooth, level cut through the trunk of a tree T while exerting only such effort as is required to force the cutting assembly 2 through the tree T, as he is not required to also support the weight of the cutting attachment. In addition, the operator can apply a substantially greater force in the direction of the cut in that he can apply his entire strength in the direction of the cut, if necessary. Still further, in the event that a single cut in one direction is not possible, the operator can easily move the mower chassis 5 around the periphery of the tree so that a cut can be made around the entire circumference of the tree which can be both smooth and level. And finally, after the clearing operation has been completed, the attachment 2 may be easily and readily removed from the mower 1 and may be replaced by the conventional mower blade for use in the conventional manner as a power mower.

Figure 9:
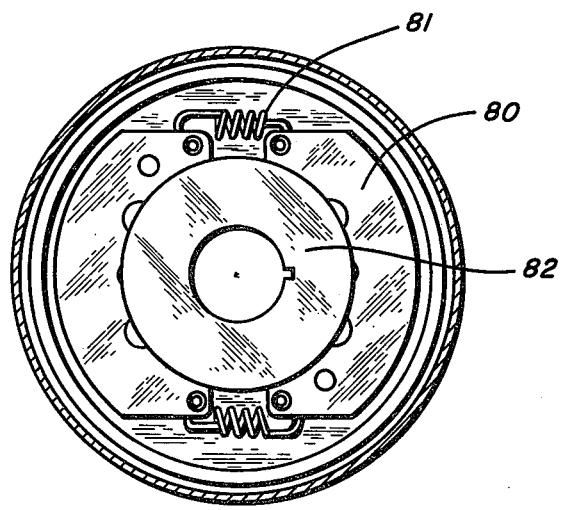
FIG. 9 is a horizontal section view taken along the line 9—9 of FIG. 8.

In reference to FIGS. 8 and 9 of the drawings, there is disclosed another modification of the clutch assembly, designated generally at 79, which includes a pair of brake shoes 80 held together in resilient relation by a pair of oppositively disposed springs 81 which mounts the shoes 80 on an inner hub 82. Here again, the clutch assembly includes an outer member 83 adapted to be covered by a dust cover 84. Similarly, a driving gear 86 is mounted on the member 83 adapted for driving engagement with the cutting chain 16 as hereinbefore described. By this arrangement, the attachment device of the invention can be used over a wide range of engine specifications for a given application. For example, the attachment may be used from one horse power engines up to engines having horse power in excess of 3,500 RPM. Moreover, it will be seen that the device can be used with riding-type lawn mowers, as desired.

I claim:

1. A tree cutting attachment for rotary power mowers of the type having a generally vertically oriented drive shaft comprising,
   adaptor means for interchangeable mounting said attachment on the frame of a rotary power mower,
   said adaptor means including a generally flat plate arranged for mounting directly beneath and on the underside of the frame for positioning a cutting element in close proximity to the ground,
   a chain saw assembly operably connected to said adaptor means and projecting outwardly from the side of the frame for cutting engagement with a tree, said chain saw assembly including a continuous cutting element movably mounted on a support arm for cutting engagement with said tree, said chain saw assembly including a generally flat, elongated arm having one end connected to said plate and having its opposite end projecting outwardly from one side of the frame in the mounted position thereof, a drive assembly attached to said plate and arranged for operable connection between the drive shaft of the power mower and said cutting element to impart movement to the cutting element for cutting through a tree, said drive assembly including a driven shaft extending through said plate mounted for rotation about a generally vertical axis, and said driven shaft being adapted for connection with the drive shaft of the power mower for driving the cutting element in a horizontal direction in the mounted position of said attachment.

2. An attachment in accordance with claim 1, wherein said plate includes a plurality of holes disposed in a predetermined pattern for interchangeable mounting of the attachment to various types of rotary mowers, and a support bracket mounted on the underside of said plate for mounting an adjustable mounting block for adjustably connecting the tension on the cutting element.

3. An attachment in accordance with claim 1, wherein said power mower is of the rotary-type having a generally vertically oriented drive shaft for operable connection to the drive shaft of said drive assembly.

4. An attachment in accordance with claim 1, including adjustment means between said plate and said arm for properly tensioning said cutting element in the cutting position thereof.

5. An attachment in accordance with claim 1, wherein said power mower is of a wheeled construction for moving said frame relative to the ground, and said frame includes a handle for manipulating said power mower and for moving the cutting element into and out of cutting engagement with the tree.

* * * * *